United States Patent
Kim et al.

(10) Patent No.: US 11,597,815 B2
(45) Date of Patent: *Mar. 7, 2023

(54) PLASTICIZER COMPOSITION, RESIN COMPOSITION, AND METHOD OF PREPARING THE SAME

(71) Applicant: LG CHEM, LTD., Seoul (KR)

(72) Inventors: Hyun Kyu Kim, Daejeon (KR); Mi Yeon Lee, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 103 days.

This patent is subject to a terminal disclaimer.

(21) Appl. No.: 16/748,190

(22) Filed: Jan. 21, 2020

(65) Prior Publication Data

US 2020/0181362 A1 Jun. 11, 2020

Related U.S. Application Data

(63) Continuation of application No. 15/557,773, filed as application No. PCT/KR2016/008043 on Jul. 22, 2016, now Pat. No. 10,584,229.

(30) Foreign Application Priority Data

Jul. 24, 2015 (KR) .................. 10-2015-0105323
Jul. 21, 2016 (KR) .................. 10-2016-0092873

(51) Int. Cl.
*C08L 27/06* (2006.01)
*C08K 5/12* (2006.01)
(Continued)

(52) U.S. Cl.
CPC ............... *C08K 5/1515* (2013.01); *C08J 5/18* (2013.01); *C08K 5/0016* (2013.01); *C08K 5/12* (2013.01);
(Continued)

(58) Field of Classification Search
None
See application file for complete search history.

(56) References Cited

U.S. PATENT DOCUMENTS 3,377,304 A * 4/1968 Kuester ............... C08K 5/0016
524/114
10,584,229 B2 * 3/2020 Kim ..................... C08K 5/1515
(Continued)

FOREIGN PATENT DOCUMENTS

CN 101238175 A 8/2008
CN 103756127 A 4/2014
(Continued)

OTHER PUBLICATIONS

XP002782603, Database WPI Week 201440 Thomson Scientific, London, GB; AN 2014-L83531 (Corresponding CN 103756127 A, published Apr. 30, 2014).
(Continued)

*Primary Examiner* — Richard A Huhn
(74) *Attorney, Agent, or Firm* — Morgan, Lewis & Bockius LLP

(57) ABSTRACT

Provided herein are a plasticizer composition, a resin composition, and a method of preparing the plasticizer composition. A plasticizer composition capable of enhancing poor physical properties occurring due to structural limitations and enhancing physical properties such as tensile strength, migration resistance, volatile loss, and the like, which are
(Continued)

required when used as a plasticizer of a resin composition, and a resin composition including the same may be provided.

15 Claims, 1 Drawing Sheet

(51) Int. Cl.
  *C08K 5/1515* (2006.01)
  *C08K 5/00* (2006.01)
  *C08J 5/18* (2006.01)
  *C08L 101/00* (2006.01)
  *C08K 5/101* (2006.01)

(52) U.S. Cl.
  CPC ............ *C08L 101/00* (2013.01); *C08K 5/101* (2013.01); *C08K 2201/014* (2013.01); *C08L 27/06* (2013.01)

(56) References Cited

U.S. PATENT DOCUMENTS

| | | | |
|---|---|---|---|
| 2005/0020718 A1* | 1/2005 | Gosse | C08K 5/0016 |
| | | | 523/105 |
| 2007/0037926 A1 | 2/2007 | Olsen et al. | |
| 2012/0085568 A1* | 4/2012 | Eaton | C08K 5/1515 |
| | | | 174/113 R |
| 2013/0137789 A1 | 5/2013 | Olsen et al. | |
| 2014/0309345 A1 | 10/2014 | Frenkel et al. | |
| 2014/0336294 A1 | 11/2014 | Kim et al. | |
| 2014/0336319 A1 | 11/2014 | Kim et al. | |
| 2014/0336320 A1* | 11/2014 | Lee | C07C 67/03 |
| | | | 562/480 |
| 2015/0025186 A1 | 1/2015 | Kim et al. | |
| 2017/0081501 A1* | 3/2017 | Kim | C08L 101/00 |

FOREIGN PATENT DOCUMENTS

| | | | |
|---|---|---|---|
| CN | 103975011 A | | 8/2014 |
| CN | 104395386 A | | 3/2015 |
| JP | 1993001155 A | | 1/1993 |
| KR | 20130067510 A | | 6/2013 |
| KR | 20140052838 A | * | 5/2014 |
| KR | 20140052838 A | | 5/2014 |
| KR | 20140116371 A | | 10/2014 |
| KR | 101447376 B1 | | 12/2014 |

OTHER PUBLICATIONS

XP002782604, Database WPI Week 201443 Thomson Scientific, London, GB; AN 2014-J34376 (Corresponding KR 2014-0052838 A, published May 7, 2014).

XP055487882, George R. Riser et al., Vernolic acid esters as plasticizers for polyvinyl chloride, Journal of the American Oil Chemists' Society (JAOCS) vol. 43, No. 7, Jul. 1, 1966, pp. 456-457.

* cited by examiner

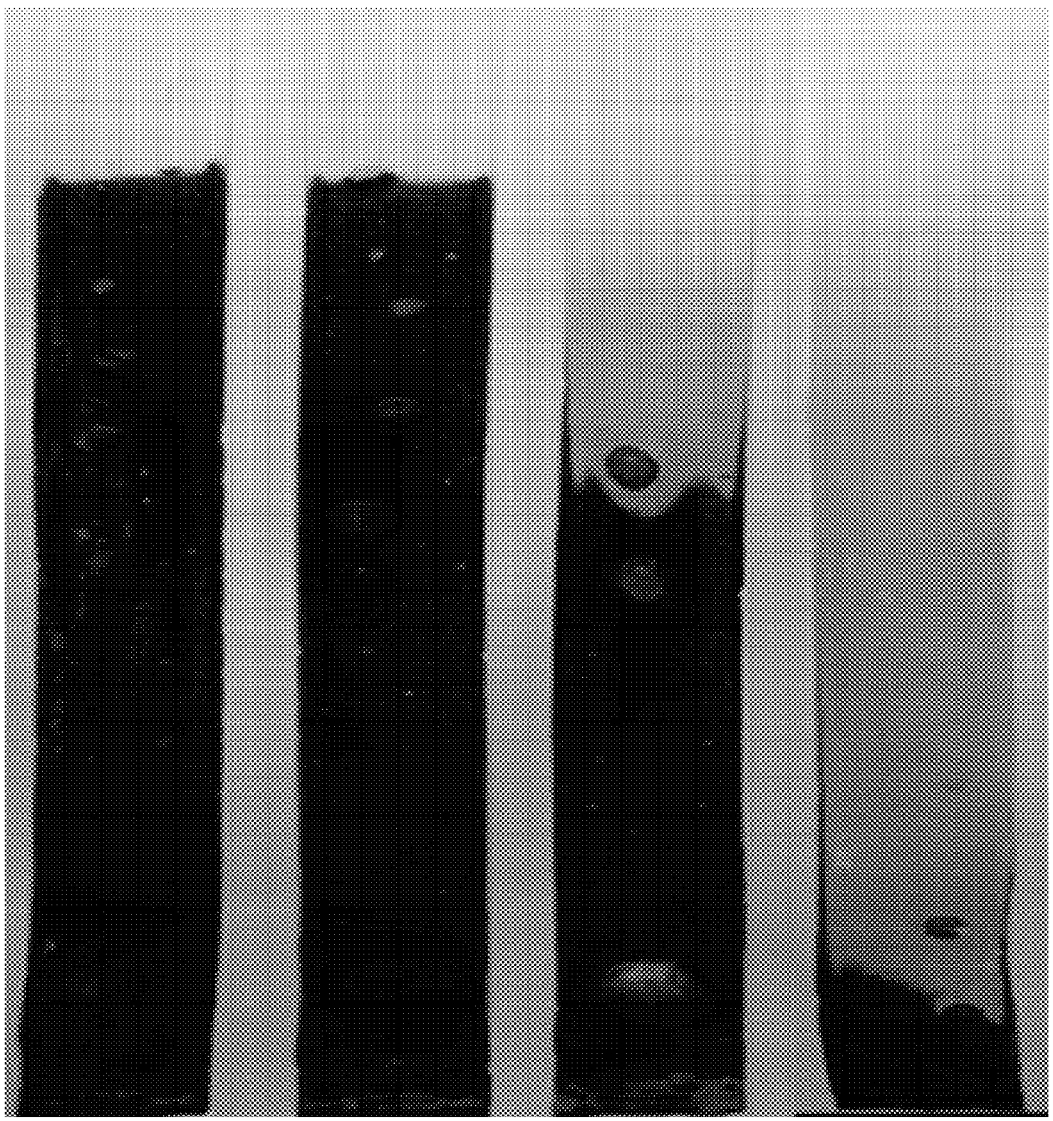

PLASTICIZER COMPOSITION, RESIN COMPOSITION, AND METHOD OF PREPARING THE SAME

CROSS-REFERENCE TO RELATED APPLICATION

This application is a Continuation of U.S. patent application Ser. No. 15/557,773, filed Sep. 12, 2017, which is the U.S. National Stage of International Application No. PCT/KR2016/008043, filed Jul. 22, 2016, and claims the benefit of Korean Patent Application No. 10-2016-0092873, filed Jul. 21, 2016, and Korean Patent Application No. 10-2015-0105323, filed Jul. 24, 2015, the contents of which are incorporated herein by reference in their entirety for all purposes as if fully set forth below.

TECHNICAL FIELD

The present invention relates to a plasticizer composition, a resin composition, and a method of preparing the plasticizer composition.

BACKGROUND ART

Generally, in plasticizers, an alcohol reacts with a polycarboxylic acid such as phthalic acid and adipic acid to form an ester corresponding thereto. In addition, in consideration of domestic and foreign regulations of phthalate-based plasticizers which are harmful to the human body, research on plasticizer compositions that can replace phthalate-based plasticizers such as terephthalate-based plasticizers, adipate-based plasticizers, other polymer-based plasticizers, and the like has been continuously conducted.

Meanwhile, to manufacture products such as flooring materials, wallpaper, sheets, interior and exterior materials for automobiles, films, electric wires, and the like, the use of a suitable plasticizer is required in consideration of migration, volatile loss, extension, elongation, plasticizing efficiency, and the like. According to properties required according to the type of industry in such various applications, i.e., tensile strength, elongation, light resistance, migration, gelation properties, and the like, a PVC resin is mixed with a plasticizer, a filler, a stabilizer, a viscosity reducing agent, a dispersant, an antifoaming agent, a foaming agent, or the like.

For example, from among plasticizer compositions applicable to PVC, when inexpensive diethylhexylterephthalate is used, plasticizing efficiency is low, an absorption rate of the plasticizer is relatively low, and light resistance and migration are also poor.

Therefore, there is a need to develop products of a novel composition, such as products with superior properties to diethylhexylterephthalate, and continuously conduct research on the most suitable technology for the use thereof as a plasticizer for vinyl chloride-based resins.

DISCLOSURE

Technical Problem

Therefore, the inventors of the present invention continuously conducted research on plasticizers and verified a plasticizer composition capable of enhancing poor physical properties occurring due to structural limitations, thus completing the present invention.

That is, an object of the present invention is to provide a plasticizer capable of enhancing physical properties, such as plasticizing efficiency, migration, gelation properties, light resistance, and the like which are required for formulation of sheets and the like, when used as a plasticizer of a resin composition, a method of preparing the same, and a resin composition including the plasticizer.

Advantageous Effects

A plasticizer composition according to an embodiment of the present invention can provide excellent physical properties, such as high plasticizing efficiency, high tensile strength and high elongation as well as high migration resistance, high volatilization resistance, and the like, when used in a resin composition, and, in particular, may be suitable for use in resin products which have high plasticizing efficiency and a high absorption rate, and the like and require environmentally-friendly plasticizers according to the use of vegetable raw materials.

DESCRIPTION OF DRAWINGS

The FIG. is an image showing thermal stability test results of samples of examples and comparative examples.

BEST MODE OF THE INVENTION

Examples

Hereinafter, the present invention will be described in detail with reference to the following examples. However, the examples according to the present invention may be changed in many different forms and should not be construed as being limited to the embodiments set forth herein. Rather, these examples are provided so that this disclosure will be thorough and complete, and will fully convey the scope of the present invention to those of ordinary skill in the art.

Preparation Example 1: Preparation of DEHTP 498.0 g of purified terephthalic acid (TPA), 1170 g of 2-ethylhexyl alcohol (2-EH) (a molar ratio of TPA:2-EH=1.0:3.0), and 1.54 g (0.31 parts by weight with respect to 100 parts by weight of TPA) of a titanium-based catalyst (tetraisopropyl titanate (TIPT)) were added to a 3 L four-neck reactor equipped with a cooler, a condenser, a decanter, a reflux pump, a temperature controller, a stirrer, and the like, and the temperature of the reactor was slowly raised up to about 170° C. The generation of produced water started at about 170° C., an esterification reaction was performed at a reaction temperature of about 220° C. under an atmospheric pressure condition for about 4.5 hours while continuously introducing nitrogen gas, and the reaction was terminated when an acid value reached 0.01.

After the reaction was completed, distillation extraction was performed under reduced pressure for 0.5 hours to 4 hours to remove unreacted raw materials. Steam extraction was performed for 0.5 hours to 3 hours under reduced pressure using steam to remove the unreacted raw materials at a predetermined amount level or less. A temperature of a reaction solution was cooled to about 90° C. to perform neutralization treatment using an alkaline solution. In addition, washing may also be performed and thereafter, water is removed by dehydrating the reaction solution. A filter medium was introduced into the dehydrated reaction solution and stirred for a certain period of time, followed by filtration, thereby finally obtaining 1,326.7 g (yield: 99.0%) of di(2-ethylhexyl)terephthalate.

Preparation Example 2: Preparation of DINTP

DINTP was prepared in the same manner as in Preparation Example 1 except that isononyl alcohol was used instead of using 2-ethylhexyl alcohol during the esterification reaction.

Preparation Example 3: Preparation of DEHTP/BEHTP/DBTP Mixture (First Mixture)

2,000 g of di(2-ethylhexyl)terephthalate and 340 g (17 parts by weight based on 100 parts by weight of DEHTP) of n-butanol were added to a reactor equipped with a stirrer, a condenser, and a decanter, and then a trans-esterification reaction was performed at a reaction temperature of 160° C. for 2 hours under a nitrogen atmosphere to obtain an ester-based plasticizer composition including 4.0 wt % of di butyl terephthalate (DRIP), 35.0 wt % of butyl(2-ethylhexyl) terephthalate (BEHTP), and 61.0 wt % of di(2-ethylhexyl) terephthalate (DEHTP).

The reaction product was subjected to mixed distillation to remove butanol and 2-ethylhexyl alcohol, thereby completing the preparation of a first mixture.

Preparation Example 4: Preparation of DINTP/EHINTP/DEHTP Mixture (Third Mixture)

498.0 g of purified terephthalic acid (TPA), 975 g of 2-ethylhexyl alcohol (2-EH) (a molar ratio of TPA:2-EH=1.0:2.5), 216.5 g of isononyl alcohol (INA) (molar ratio of TPA:INA=1.0:0.5), and 1.54 g (0.31 parts by weight with respect to 100 parts by weight of TPA) of a titanium-based catalyst (tetraisopropyl titanate (TIPT)) were added to a 3 L four-neck reactor equipped with a cooler, a condenser, a decanter, a reflux pump, a temperature controller, a stirrer, and the like, and the temperature of the reactor was slowly raised up to about 170° C. The generation of produced water started at about 170° C., an esterification reaction was performed at a reaction temperature of about 220° C. under an atmospheric pressure condition for about 4.5 hours while continuously introducing nitrogen gas, and the reaction was terminated when an acid value reached 0.01.

After the reaction was completed, distillation extraction was performed under reduced pressure for 0.5 hours to 4 hours to remove unreacted raw materials. Steam extraction was performed for 0.5 hours to 3 hours under reduced pressure using steam to remove the unreacted raw materials at a predetermined amount level or less. A temperature of a reaction solution was cooled to about 90° C. to perform neutralization treatment using an alkaline solution. In addition, washing may also be performed and thereafter, water is removed by dehydrating the reaction solution. A filter medium was introduced into the dehydrated reaction solution and stirred for a certain period of time, followed by filtration, thereby finally obtaining a third mixture.

For reference, the mixture of Preparation Example 4 may also be prepared by performing a trans-esterification reaction using isononyl alcohol, instead of using 2-ethylhexyl alcohol in Preparation Example 3.

Preparation Example 5: Preparation of Epoxidized Fatty Acid Butyl Ester (eFABE)

A trans-esterification reaction was performed using 500 g of epoxidized soybean oil and 490 g of butanol as reaction raw materials, thereby finally obtaining 510 g (yield: 95%) of epoxidized butyl soyate.

Preparation Example 6: Preparation of Epoxidized Fatty Acid 2-Ethylhexyl Ester (eFAEHE)

584 g (yield: 95%) of epoxidized 2-ethylhexyl soyate was prepared in the same manner as in Preparation Example 5, except that 490 g of 2-ethylhexyl alcohol was used instead of 490 g of butanol.

Compositions of examples and comparative examples using the materials prepared according to Preparation Examples 1 to 6 are shown in Tables 1 to 5 below.

TABLE 1

| | TP-based material | eFAAE material | Mixing weight ratio |
|---|---|---|---|
| Example 1-1 | DEHTP | eFABE | 7:3 |
| Example 1-2 | DEHTP | eFABE | 5:5 |
| Example 1-3 | DEHTP | eFAEHE | 7:3 |
| Example 1-4 | DEHTP | eFAEHE | 5:5 |
| Example 1-5 | DEHTP | eFAEHE + eFABE (5:5) | 7:3 |

TABLE 2

| | TP-based material | eFAAE material | Mixing weight ratio |
|---|---|---|---|
| Example 2-1 | DINTP | eFABE | 7:3 |
| Example 2-2 | DINTP | eFABE | 5:5 |
| Example 2-3 | DINTP | eFAEHE | 7:3 |
| Example 2-4 | DINTP | eFAEHE | 5:5 |
| Example 2-5 | DINTP | eFAEHE + eFABE (5:5) | 7:3 |

TABLE 3

| | TP-based material | eFAAE material | Mixing weight ratio |
|---|---|---|---|
| Example 3-1 | DEHTP/BEHTP/DBTP | eFABE | 7:3 |
| Example 3-2 | DEHTP/BEHTP/DBTP | eFABE | 5:5 |
| Example 3-3 | DEHTP/BEHTP/DBTP | eFAEHE | 7:3 |
| Example 3-4 | DEHTP/BEHTP/DBTP | eFAEHE | 5:5 |
| Example 3-5 | DEHTP/BEHTP/DBTP | eFAEHE + eFABE (5:5) | 5:5 |

TABLE 4

| | TP-based material | eFAAE material | Mixing weight ratio | Third composition |
|---|---|---|---|---|
| Example 4-1 | DEHTP | eFABE | 7:3 | ESO (60 parts by weight) |
| Example 4-2 | DINTP | eFAEHE | 7:3 | ESO (100 parts by weight) |
| Example 4-3 | DEHTP/BEHTP/DBTP | eFABE | 7:3 | ESO (40 parts by weight) |

TABLE 5

| | First composition | Second composition | Mixing weight ratio |
|---|---|---|---|
| Comparative Example 1 | DEHTP | — | — |
| Comparative Example 2 | DINTP | — | — |
| Comparative Example 3 | DEHTP/BEHTP/DBTP | — | — |
| Comparative Example 4 | DEHTP | eFAME | 5:5 |
| Comparative Example 5 | DINTP | eFAME | 5:5 |
| Comparative Example 6 | DIDP | eFAME | 7:3 |
| Comparative Example 7 | DOP | eFAME | 7:3 |
| Comparative Example 8 | DIDP | eFAINE | 5:5 |
| Comparative Example 9 | DEHTP/BEHTP/DBTP | eFAINE | 7:3 |
| Comparative Example 10 | DEHTP/BEHTP/DBTP | eFAINE | 5:5 |

Experimental Example 1: Specimen Preparation and Performance Evaluation

Experimental specimens were prepared using the plasticizer compositions of the examples and the comparative examples. With reference to ASTM D638, the specimens were prepared by mixing 40 parts by weight of each plasticizer composition and 3 parts by weight of a barium-zinc stabilizer with 100 parts by weight of PVC in a 3 L super mixer at 100° C. and 700 rpm for 2 minutes and 1,300 rpm for about 10 minutes, and performing roll milling on the resulting mixture at 160° C. for 3 minutes to fabricate a 5 mm sheet.

A press operation was performed on each sheet at 180° C. under low-pressure for 2.5 minutes, and under high-pressure for 2 minutes, and a cooling operation was performed for 3 minutes, and then a 1 to 3 mm sheet was fabricated and prepared into several type C dumbbell-shaped specimens. A test for evaluating the following physical properties was conducted using each specimen.

<Test Items>

Hardness Measurement

Shore (shore "A") hardness was measured at 25° C. using ASTM D2240.

Tensile Strength Measurement

A breaking point of each specimen was measured after pulling the specimen at a cross-head speed of 200 mm/min (1T) using a test instrument, i.e., U.T.M (manufacturer: Instron, Model name: 4466) by an ASTM D638 method. Tensile strength was calculated as follows:

Tensile strength (kgf/cm$^2$)=load value (kgf)/thickness (cm)×width (cm)

Elongation Rate Measurement

A breaking point of each specimen was measured after pulling the specimen at a cross-head speed of 200 mm/min (1T) using the U.T.M test instrument by an ASTM D638 method, and an elongation rate was calculated as follows:

Elongation rate (%)=length after elongation/initial length×100

Migration Loss Measurement

Specimens having a thickness of 2 mm or more were obtained according to KSM-3156, and a PS plate was attached to opposite surfaces of each specimen and then a load of 1 kgf/cm$^2$ was applied thereto. The specimens were maintained in a hot air circulating oven (80° C.) for 72 hours, taken out thereof, and cooled at room temperature for 4 hours. Thereafter, the PS plates were removed from the opposite surfaces of the specimen, weights before and after being maintained in the oven were measured, and migration loss was calculated using the following Equation:

Migration loss (%)={(initial weight of specimen at room temperature-weight of specimen after maintained in oven)/initial weight of specimen at room temperature}×100

Volatile Loss Measurement

The prepared specimens were heated at 100° C. for 72 hours, and then the weights of the specimens were measured.

A volatile loss of each specimen was calculated as follows:

Volatile loss (wt %)=initial weight of specimen−(weight of specimen after heated at 100° C. for 72 hours)/initial weight of specimen×100

Absorption Rate Measurement

An absorption rate was evaluated by measuring the time taken to reach a state in which after resin and ester compounds were mixed together using a planatary mixer (Brabender, P600) at 77° C. and 60 rpm, and a torque of the mixer was stabilized.

Thermal Stability Measurement

The prepared specimens were heated to 230° C. in a Mathis oven, and combustion degrees of the specimens were measured.

Performance evaluation results of the specimens according to the above-described test items are shown in Tables 6 to 10 below, and heat resistance evaluation results thereof are illustrated in the FIG.

TABLE 6

| | Hardness (Shore "A") | Tensile strength (kg/cm$^2$) | Elongation rate (%) | Migration loss (%) | Volatile loss (%) | Absorption rate (sec) |
|---|---|---|---|---|---|---|
| Example 1-1 | 85.6 | 230.2 | 335.6 | 4.12 | 2.77 | 4:57 |
| Example 1-2 | 84.3 | 232.4 | 314.2 | 4.35 | 3.08 | 4:03 |
| Example 1-3 | 86.2 | 247.8 | 325.6 | 4.32 | 2.62 | 6:08 |
| Example 1-4 | 85.1 | 250.3 | 339.5 | 4.56 | 2.84 | 6:49 |
| Example 1-5 | 85.8 | 241.5 | 331.8 | 4.18 | 2.68 | 5:11 |

TABLE 7

|  | Hardness (Shore "A") | Tensile strength (kg/cm$^2$) | Elongation rate (%) | Migration loss (%) | Volatile loss (%) | Absorption rate (sec) |
| --- | --- | --- | --- | --- | --- | --- |
| Example 2-1 | 87.9 | 234.4 | 320.0 | 5.33 | 1.74 | 5:35 |
| Example 2-2 | 86.4 | 232.8 | 325.2 | 5.67 | 2.11 | 4:22 |
| Example 2-3 | 88.3 | 253.3 | 309.2 | 5.02 | 1.52 | 7:10 |
| Example 2-4 | 87.3 | 250.1 | 321.7 | 5.42 | 1.89 | 6:10 |
| Example 2-5 | 88.1 | 247.9 | 315.4 | 5.24 | 1.58 | 6:15 |

TABLE 8

|  | Hardness (Shore "A") | Tensile strength (kg/cm$^2$) | Elongation rate (%) | Migration loss (%) | Volatile loss (%) | Absorption rate (sec) |
| --- | --- | --- | --- | --- | --- | --- |
| Example 3-1 | 83.4 | 232.5 | 352.1 | 2.25 | 3.56 | 4:43 |
| Example 3-2 | 82.1 | 235.6 | 356.8 | 2.39 | 3.21 | 4:03 |
| Example 3-3 | 84.4 | 250.1 | 360.2 | 2.51 | 3.08 | 5:02 |
| Example 3-4 | 84.2 | 255.7 | 362.8 | 2.74 | 2.83 | 4:42 |
| Example 3-5 | 83.0 | 250.2 | 360.9 | 2.44 | 2.91 | 4:21 |

TABLE 9

|  | Hardness (Shore "A") | Tensile strength (kg/cm$^2$) | Elongation rate (%) | Migration loss (%) | Volatile loss (%) | Absorption rate (sec) |
| --- | --- | --- | --- | --- | --- | --- |
| Example 4-1 | 85.0 | 252.6 | 359.7 | 3.16 | 1.88 | 5:12 |
| Example 4-2 | 86.7 | 258.9 | 342.1 | 3.41 | 1.02 | 6:45 |
| Example 4-3 | 83.8 | 254.1 | 357.8 | 1.78 | 2.52 | 5:10 |

TABLE 10

|  | Hardness (Shore "A") | Tensile strength (kg/cm$^2$) | Elongation rate (%) | Migration loss (%) | Volatile loss (%) | Absorption rate (sec) |
| --- | --- | --- | --- | --- | --- | --- |
| Comparative Example 1 | 87.4 | 235.9 | 310.1 | 4.00 | 2.44 | 7:25 |
| Comparative Example 2 | 89.1 | 239.0 | 303.9 | 5.35 | 1.04 | 8:05 |
| Comparative Example 3 | 84.7 | 230.8 | 332.3 | 2.11 | 3.84 | 5:32 |
| Comparative Example 4 | 83.2 | 215.6 | 308.2 | 8.41 | 6.14 | 2:17 |
| Comparative Example 5 | 85.1 | 217.4 | 310.5 | 10.52 | 5.88 | 2:28 |
| Comparative Example 6 | 88.7 | 234.8 | 284.5 | 5.62 | 4.21 | 9:34 |
| Comparative Example 7 | 82.4 | 218.4 | 312.4 | 4.33 | 9.51 | 4:22 |
| Comparative Example 8 | 86.4 | 238.2 | 265.9 | 4.37 | 3.34 | 11:49 |
| Comparative Example 9 | 85.2 | 234.1 | 312.5 | 4.15 | 3.08 | 5:25 |
| Comparative Example 10 | 85.7 | 238.1 | 310.2 | 5.65 | 3.03 | 5:11 |

Referring to Tables 6 to 10, it can be confirmed that, when compared to Comparative Examples 1 to 3 not including an epoxy-based alkyl ester compound, which is used as an existing general-purpose product having excellent basic physical properties while having problems in terms of price competitiveness, limited applications, and the like, the specimens of the examples including the same exhibited almost the same mechanical and physical properties as those in Comparative Examples 1 to 3 and exhibited considerable improvement in absorption rate and migration loss or volatile loss.

In addition, it can be confirmed that Comparative Examples 4 to 10, using an epoxidized methyl ester compound or epoxidized isononyl ester compound not having 4 or 8 carbon atoms from among epoxy-based alkyl ester compounds, exhibit considerably poor basic mechanical and physical properties as compared to the examples. In particular, it can be confirmed that the plasticizer compositions of Comparative Examples 4 to 10 have problems with being used as products due to significantly deteriorated physical properties thereof in terms of tensile strength or elongation rate, and in the case of Comparative Examples 4 and 5, fairly poor migration loss properties are exhibited, in the case of Comparative Examples 4, 5, and 7, fairly poor volatile loss properties are exhibited, and in the case of Comparative Example 8, a much lower absorption rate is exhibited.

From the above-described results, it can be confirmed that, when a mixture of a terephthalate-based material and an epoxy-based alkyl ester compound wherein the number of carbon atoms of an alkyl is 4 or 8 is used, mechanical and physical properties may be enhanced and there is a considerable improvement in migration properties or volatile loss properties.

In addition, comparing Examples 1-1 to 1-5 with Examples 3-1 to 3.5, Examples 3-1 to 3-5 exhibit a low hardness and a high elongation rate, from which it can be confirmed that the plasticizer compositions of Examples 3-1 to 3-5 may be suitably used for specific applications.

In addition, it can be confirmed that, when epoxidized oil is included as an additional composition as in Examples 4-1 to 4-3, migration loss and volatile loss properties are significantly enhanced without deterioration of mechanical and physical properties.

Furthermore, referring to the FIG., it can be confirmed that, when epoxidized oil is additionally included, thermal stability may be enhanced, and the specimen of Comparative Example 1 or 2 was turned into black ashes through complete combustion, and the case of Example 1-1 not including epoxidized oil was incompletely burned as compared to the comparative examples, while the case of Example 4-1 including epoxidized oil exhibited a much lower degree of combustion than that of the comparative examples or Example 1-1.

Mode of the Invention

Hereinafter, the present invention will be described in detail.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

The term "butyl" as used herein refers to a $C_4$ alkyl group containing both a straight chain and a branched chain, and examples thereof include n-butyl, isobutyl, and t-butyl. Preferably, the butyl group may be n-butyl or isobutyl.

The terms "octyl" and "2-ethylhexyl" as used herein refers to a $C_8$ alkyl group, and the term "octyl" may be interchangeably used with an abbreviation for 2-ethylhexyl. In some cases, the octyl group may refer to octyl as a straight alkyl group, or 2-ethylhexyl as a branched alkyl group.

Plasticizer Composition

According to an embodiment of the present invention, there is provided a plasticizer composition including: a terephthalate-based material; and an epoxy-based alkyl ester compound, in which a weight ratio of the terephthalate-based material to the epoxy-based alkyl ester compound is 99:1 to 1:99, and the epoxy-based alkyl ester compound is a single compound or a mixture of two or more compounds.

The plasticizer composition including a terephthalate-based material may be provided. In particular, the terephthalate-based material may be used in an amount selected from ranges of 1 wt % to 99 wt %, 20 wt % to 99 wt %, 40 wt % to 99 wt %, 50 wt % to 95 wt %, 60 wt % to 90 wt %, and the like, based on a total weight of the plasticizer composition.

The terephthalate-based material may be a single compound selected from the group consisting of di(2-ethylhexyl) terephthalate (DEHTP), diisononyl terephthalate (DINTP), dibutyl terephthalate (DBTP), butyl isononyl terephthalate (BINTP), butyl(2-ethylhexyl)terephthalate (BEHTP), and (2-ethylhexyl)isononyl terephthalate (EHINTP) or a mixture of two or more of these compounds.

The terephthalate-based material may be a mixture of three terephthalate-based materials, for example, a first mixture of di(2-ethylhexyl)terephthalate, butyl(2-ethylhexyl)terephthalate, and dibutyl terephthalate, a second mixture of diisononyl terephthalate, butyl isononyl terephthalate, and dibutyl terephthalate, or a third mixture of di(2-ethylhexyl)terephthalate, (2-ethylhexyl)isononyl terephthalate, and diisononyl terephthalate.

In particular, the first, second, and third mixtures may have a specific composition ratio. The first mixture may include 3.0 mol % to 99.0 mol % of di(2-ethylhexyl) terephthalate, 0.5 mol % to 96.5 mol % of butyl(2-ethylhexyl)terephthalate, and 0.5 mol % to 96.5 mol % of dibutyl terephthalate, the second mixture may include 3.0 mol % to 99.0 mol % of diisononyl terephthalate 0.5 mol % to 96.5 mol % of butyl isononyl terephthalate, and 0.5 mol % to 96.5 mol % of dibutyl terephthalate, and the third mixture may include 3.0 mol % to 99.0 mol % of di(2-ethylhexyl) terephthalate, 0.5 mol % to 96.5 mol % of (2-ethylhexyl) isononyl terephthalate, and 0.5 mol % to 96.5 mol % of diisononyl terephthalate.

The composition ratio may be a mixed composition ratio produced by an esterification reaction and may be an intended composition ratio in which a specific compound is further mixed. The mixed composition ratio may be appropriately adjusted according to desired physical properties.

The plasticizer composition includes a terephthalate-based material and an epoxy-based alkyl ester compound. The epoxy-based alkyl ester compound may be represented by Formula 1 below and have an iodine value (I.V.) of less than 4 g $I_2$/100 g.

<Formula 1>

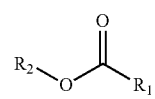

wherein, in Formula 1, $R_1$ is a $C_8$-$C_{20}$ alkyl group or an alkyl group containing one or more epoxy groups, and $R_2$ is a $C_4$ or $C_8$ alkyl group.

The epoxy-based alkyl ester compound may have an oxirane value (O.V.) of 6.0% or more, 6.3% or more, preferably, 6.5% or more. In addition, the oxirane value may vary according to the number of epoxy groups included in a substituent denoted as $R_1$ in Formula 1, may be measured by titration, and may be measured by a method of ASTM D1562-04 using a sample and an acid solution.

In addition, the iodine value of the epoxy-based alkyl ester compound may be less than 4 g $I_2$/100 g, preferably, 3.8 $I_2$/100 g or less. The iodine value refers to the content of double bonds present in molecules, and may be obtained from values measured by titration through iodination of the double bonds.

The measured iodine value and oxirane value may be important factors when the epoxy-based alkyl ester compound is applied to the plasticizer composition. In particular, when the iodine value of the epoxy-based alkyl ester compound is 4 g $I_2$/100 g or more, compatibility of the plasticizer composition with a resin may be significantly reduced and thus the plasticizer composition may not be used as a plasticizer. When the iodine value of the epoxy-based alkyl ester compound is less than 4 g $I_2$/100 g, mechanical and physical properties, such as tensile strength, elongation rate, absorption rate, and the like, may be enhanced. In addition, the oxirane value may also have a technical significance similar to that of the iodine value and may have a similar effect.

The iodine value may refer to the content of double bonds, and the content of double bonds may be the content of double bonds remaining after performing an epoxidation reaction, such as epoxidation of vegetable oil, epoxidation of fatty acid alkyl esters, or the like. That is, an oxirane value and an iodine value may be indexes for a degree to which epoxidation proceeds, may be associated with each other to some extent, and may be theoretically in inverse proportion to each other.

However, double bonds of vegetable oil or fatty acid alkyl esters may substantially vary according to material, and thus the two parameters may not accurately form an inverse proportion relation or a trade-off relation, and, of two materials, a material with a higher iodine value may also have a higher oxirane value. Thus, the epoxy-based alkyl ester compound having iodine and oxirane values within the above-described ranges may be applied to the plasticizer composition.

Meanwhile, the epoxy-based alkyl ester compound may have an epoxidation index (E.I.) of 1.5 or more.

As described above, the iodine value and the oxirane value may satisfy the above-described relation, and, simultaneously, the epoxidation index may satisfy a range of 1.5 or more. The term "epoxidation index" as used herein refers to a ratio of oxirane value to iodine value of the epoxy-based alkyl ester compound, and may be a ratio of double bonds epoxidated by epoxidation to remaining unreacted double bonds.

As described above, when the epoxidation index is less than 1.5 due to a small amount of an oxirane or a high iodine value, or when epoxidation itself does not proceed, hardness of the plasticizer composition increases and thus a plasticizing effect thereof may be significantly deteriorated, and migration loss and volatile loss properties may also be significantly deteriorated.

In particular, the epoxidation index, which is a ratio (O.V./I.V.) of an oxirane value to an iodine value, may be 1.5 or more. That is, when a value obtained by dividing the oxirane value of the epoxy-based alkyl ester compound by the iodine value thereof is 1.5 or more, a more suitable plasticizer composition may be obtained, and, in particular, the plasticizer composition may tend to have increased compatibility with a resin.

The epoxy-based alkyl ester compound may be an epoxidized fatty acid alkyl ester (eFAAE), and, in particular, may be represented by Formula 1 above, "alkyl" of the epoxy-based alkyl ester compound may have 4 or 8 carbon atoms.

However, in the present invention, $R_2$ of Formula 1 may have 4 to 8 carbon atoms, and is preferably a butyl group or a 2-ethylhexyl group. In addition, the epoxy-based alkyl ester compound of Formula 1 may be a mixed composition including two or more compounds, and the mixed composition including two or more compounds may be a mixture of a compound having 4 carbon atoms and a compound having 8 carbon atoms. When $R_2$ of Formula 1 is a $C_4$ or $C_8$ group, the plasticizer composition may have excellent absorption properties and thus exhibit less of a gelling phenomenon, may exhibit enhanced processability, excellent basic mechanical and physical properties such as tensile strength or elongation rate, and, in particular, may exhibit excellent migration or volatile loss properties.

In this regard, a weight ratio of the terephthalate-based material and the epoxy-based alkyl ester compound included in the plasticizer composition may range from 99:1 to 1:99, 99:1 to 20:80, or 99:1 to 40:60, preferably, 95:5 to 50:50 or 90:10 to 60:40.

As described above, when the mixed plasticizer composition of a terephthalate-based material and an epoxy-based alkyl ester compound is used, high tensile strength and elongation rate may be obtained, improved effects in terms of migration and volatile loss may be obtained, and an absorption rate may be controlled and thus processability may also be enhanced.

Method of Preparing a Plasticizer Composition

According to an embodiment of the present invention, there is provided a method of preparing a plasticizer composition, including: preparing a terephthalate-based material; preparing an epoxy-based alkyl ester compound represented by Formula 1 below by performing an esterification reaction on epoxidized oil and a $C_4$ or $C_8$ primary alkyl alcohol; and mixing the terephthalate-based material and the epoxy-based alkyl ester compound in a weight ratio of 99:1 to 1:99, in which the epoxy-based alkyl ester compound is a single compound or a mixture of two or more compounds.

The preparing of the terephthalate-based material and the preparing of the epoxy-based alkyl ester compound may be separately performed, and the materials may be directly prepared through an esterification reaction and/or a trans-esterification reaction.

The terephthalate-based material may be prepared through a direct esterification reaction between terephthalic acid and one or more alcohols selected from primary alkyl alcohols containing 4 to 12 carbon atoms, or a trans-esterification reaction between a terephthalate and a primary alkyl alcohol containing 4 to 12 carbon atoms. In addition, the epoxy-based alkyl ester compound may be prepared by a trans-esterification reaction between epoxidized oil and a primary alkyl alcohol containing 4 or 8 carbon atoms.

As a terephthalate used as a raw material to prepare the terephthalate-based material, an alkyl group of substituted ester groups at opposite sides of a benzene ring may have 1 to 12 carbon atoms, preferably, 4 to 12 carbon atoms. The $C_4$-$C_{12}$ primary alkyl alcohol may be one or more selected from the group consisting of butyl alcohol, isobutyl alcohol, 2-ethylhexyl alcohol, octyl alcohol, and isononyl alcohol.

In addition, the primary alkyl alcohol containing 4 to 8 carbon atoms used as a raw material to prepare the epoxy-based alkyl ester compound may be one or more selected from the group consisting of butyl alcohol, isobutyl alcohol, 2-ethylhexyl alcohol, and octyl alcohol. In this case, an alkyl group of the alcohol may correspond to $R_2$ of Formula 1 in the epoxy-based alkyl ester compound of Formula 1 after the reaction is completed.

The epoxidized oil may be, for example, epoxidized soybean oil, epoxidized castor oil, epoxidized linseed oil, epoxidized palm oil, epoxidized stearic acid, epoxidized oleic acid, epoxidized tall oil, epoxidized linoleic acid, or a mixture thereof, and vegetable oil may be a compound into which a certain content of epoxy groups is introduced through an epoxidation reaction.

The epoxidized oil may be, for example, represented by Formula 2 below, and may contain three ester groups in a single molecule and include a certain content of epoxy groups.

<Formula 2>

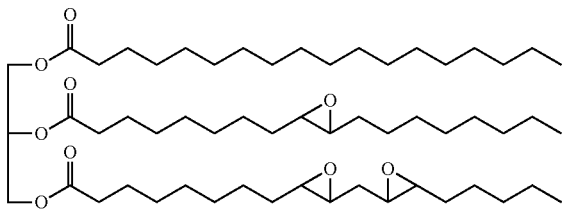

The epoxidized oil of Formula 2 is provided as one example.

In addition, the epoxidized oil may have an iodine value of less than 4 g $I_2$/100 g, and the iodine value is unlikely to vary during a trans-esterification reaction and thus may be almost the same as the iodine value of the epoxy-based alkyl ester compound, which is a reaction product. Characteristics of the iodine value are the same as those of the iodine value of the epoxy-based alkyl ester compound as described above.

When a trans-esterification reaction occurs between the epoxidized oil and the $C_4$ or $C_8$ alkyl alcohol, all the three ester groups may be separated, and, accordingly, three or more epoxy-based ester compounds in which the alkyl group of the alcohol is newly linked may be formed.

The term "trans-esterification reaction" as used herein refers to a reaction in which, as described in Reaction Scheme 1, an alcohol reacts with an ester group and thus R" of the ester group is interchanged with R' of the alcohol:

<Reaction Scheme 1>

According to an embodiment of the present invention, when the trans-esterification reaction occurs, three types of ester compositions may be produced according to three cases in which an alkoxide of an alcohol attacks carbon atoms of two ester groups (RCOOR") present in an ester-based compound; an alkoxide of an alcohol attacks carbon atoms of an ester group (RCOOR") present in an ester-based compound; and there is no reaction therebetween.

In addition, the trans-esterification reaction is advantageous in that wastewater problems are not caused and a reaction rate is high, compared to an esterification reaction between an acid and an alcohol.

For example, the terephthalate-based material may be prepared by producing a mixture of di(2-ethylhexyl)terephthalate, butyl(2-ethylhexyl)terephthalate, and dibutyl terephthalate by the trans-esterification reaction between di(2-ethylhexyl)terephthalate and butyl alcohol. The three terephthalates may be included in the mixture in amounts of 3.0 wt % to 70 wt %, 0.5 wt % to 50 wt %, and 0.5 wt % to 85 wt %, respectively, in particular, 10 wt % to 50 wt %, 0.5 wt % to 50 wt %, and 35 wt % to 80 wt %, respectively, based on a total weight of the mixture. When the amounts of the three terephthalates are within the above ranges, a terephthalate-based material (mixture) with high manufacturing efficiency, high processability and a high absorption rate may be obtained.

In addition, a composition ratio of the mixture prepared by the trans-esterification reaction may be controlled according to the amount of an alcohol added.

The amount of the added alcohol may range from 0.1 parts by weight to 89.9 parts by weight, in particular, 3 parts by weight to 50 parts by weight, more particularly, 5 parts by weight to 40 parts by weight, with respect to 100 parts by weight of the terephthalate.

As the amount of the added alcohol increases, a mole fraction of the terephthalate participating in the trans-esterification reaction increases, and thus the amounts of the two terephthalates, which reaction products, of the mixture may increase, and the amount of unreacted terephthalate may decrease in accordance therewith.

According to an embodiment of the present invention, a molar ratio of a terephthalate to an alcohol, which are reactants, may range, for example, from 1:0.005 to 5.0, from 1:0.05 to 2.5, or from 1:0.1 to 1.0. When the molar ratio thereof is within the above range, a plasticizer with high manufacturing efficiency and significantly enhanced processability may be obtained.

However, the composition ratio of the mixture of three terephthalate-based materials is not limited to the above-described ranges, and the composition ratio thereof may be varied by further adding any one of the three terephthalates, and a detailed description of suitable mixing composition ratios has already been provided above.

According to an embodiment of the present invention, the trans-esterification reaction may be performed at a reaction temperature of 120° C. to 190° C., preferably 135° C. to 180° C., more preferably, 141° C. to 179° C., for 10 minutes to 10 hours, preferably, 30 minutes to 8 hours, more preferably, for 1 hour to 6 hours. When the reaction temperature and time are within the above ranges, a mixture of terephthalate-based materials with a desired composition ratio may be effectively obtained. At this time, the reaction time may be calculated from the time at which a reaction starts at the reaction temperature after heating reactants.

The trans-esterification reaction may be performed in the presence of an acid catalyst or a metal catalyst, and, in this case, the reaction time may be shortened.

The acid catalyst may be, for example, sulfuric acid, methanesulfonic acid, p-toluenesulfonic acid, or the like, and the metal catalyst may be, for example, an organic metal catalyst, a metal oxide catalyst, a metal salt catalyst, or a metal.

The metal component may be, for example, any one selected from the group consisting of tin, titanium, and zirconium, or a mixture of two or more of these metals.

In addition, the method may further include, after the trans-esterification reaction, removing an unreacted alcohol and reaction byproducts, for example, an ester-based compound represented by Formula 3, by distillation.

The distillation process may be, for example, two-stage distillation for separating the alcohol and the reaction byproducts using a difference between boiling points thereof.

As another example, the distillation process may be mixed distillation. In this case, an ester-based plasticizer composition with a desired composition ratio may be relatively stably obtained. The mixed distillation refers to simultaneous distillation of butanol and reaction byproducts.

Generally, a trans-esterification reaction used to prepare an epoxy-based alkyl ester compound is also applied in the same manner as in the reaction for preparing a terephthalate-based material, but specific reaction conditions and the like may differ from each other. For example, there are differences as follows.

The trans-esterification reaction may be performed at a reaction temperature of 40° C. to 230° C., preferably 50° C. to 200° C., more preferably, 70° C. to 200° C., for 10 minutes to 10 hours, preferably. 30 minutes to 8 hours, more preferably, for 1 hour to 4 hours. When the reaction temperature and time are within the above ranges, a desired epoxy-based alkyl ester compound may be effectively obtained. At this time, the reaction time may be calculated from the time at which a reaction starts at the reaction temperature after heating reactants.

In addition, the method may further include removing a polyhydric alcohol and reaction byproducts produced after the trans-esterification reaction and the unreacted alcohol by purification, washing, and distillation.

The purification process may be performed by, in particular, cooling to and maintaining at a temperature of 80° C. to 100° C. for a certain period of time after the trans-esterification reaction. In this case, layer separation occurs wherein an upper layer may include an epoxy-based alkyl ester, and an alcohol, and a lower layer may include glycerin and other byproducts. Next, to neutralize a catalyst, neutralization and washing may be induced by adding an aqueous solution for neutralizing a catalyst.

The neutralization and washing processes may be performed after, first, separating the lower layer mainly including reaction byproducts, and in the neutralization and washing processes, the byproducts included in the lower layer may be dissolved in water to be discharged, and through a subsequently repeated washing process, the unreacted alcohol and water may be recovered and removed.

However, it may be necessary to vary the neutralization and washing processes according to the number of carbon atoms of an alcohol used in the t s-esterification reaction.

For example, in a case in which butanol with 4 carbon atoms is used, when the neutralization and washing processes are immediately performed, wastewater generation problems occur, and thus, butanol may be previously removed by distillation. However, in this case, catalytic activity remains, and thus there may be other problems, i.e., occurrence of an inverse reaction between glycerol as a reaction byproduct and an epoxy-based alkyl ester as a reaction product to produce an epoxidized oil-like material such as a diglyceride, a triglyceride, or the like, and, accordingly, there is a need to pay attention to the design of manufacturing processes.

In addition, as another example, when 2-ethylhexyl alcohol with 8 carbon atoms is used, the 2-ethylhexyl alcohol has low solubility in water, and thus there is no wastewater generation problem and, accordingly, both the case of removing an alcohol after the neutralization and washing processes and the case of performing the neutralization and washing processes after removal of the lower layer including reaction byproducts may be performed without severe problems.

In addition, in the case of preparing the epoxy-based alkyl ester compound, physical properties of the prepared epoxy-based alkyl ester compound may vary according to the type or amount of catalyst used, and physical properties, yield, or quality of products may vary according to reaction time or the amount of a primary alkyl alcohol reacted with epoxidized oil.

In particular, in the process of preparing an epoxy-based alkyl ester compound, NaOMe may be preferably used as a catalyst, and, when sodium hydroxide or potassium hydroxide is used as a catalyst, the color of the prepared epoxy-based alkyl ester compound may not meet its standard, and an epoxidation index, the amount of oxirane, and the like of the epoxy-based alkyl ester compound may not have desired values.

In addition, the amount of the catalyst may range from 0.1 wt % to 2.0 wt %, preferably, from 0.1 wt % to 1.0 wt %, with respect to a total weight of the epoxidized oil which is a reaction raw material. When the amount of the catalyst is within the above range, it may be most effective in terms of reaction rate, and, when the amount of the catalyst is outside the above range, an epoxidation index and the like of the epoxy-based alkyl ester compound may not meet quality standards due to a failure in adjusting the amount of the catalyst.

In preparation of the epoxy-based alkyl ester compound, amounts of epoxidized oil and a primary alkyl alcohol added may be an important factor. The primary alkyl alcohol may be added in an amount of 30 parts by weight to 100 parts by weight with respect to the amount of the epoxidized oil. When the amount of the primary alkyl alcohol is less than 30 parts by weight, a reaction does not occur efficiently, and thus residual epoxidized oil or impurities such as a dimerized material of epoxidized oil, and the like may remain in an excess amount, and, when the amount of the primary alkyl alcohol is 100 parts by weight or more, the amount of a residual alcohol to be separated is greater than the amount of a product in the purification process, and thus problems in terms of energy and manufacturing efficiency may occur during the process.

As described above, after preparing the terephthalate-based material and the epoxy-based alkyl ester compound, a process of mixing the two compounds may be performed. A mixing ratio may be appropriately selected from ranges from 99:1 to 1:99, and the two compounds may be mixed in the above-described mixing weight ratio.

In addition, the plasticizer compound according to the present invention may further include epoxidized oil, in addition to the terephthalate-based material and the epoxy-based alkyl ester compound.

In the case of a mixed plasticizer composition of the terephthalate-based material and the epoxy-based alkyl ester compound, thermal resistance from among a variety of physical properties may be relatively poor, and such a thermal resistance property may be compensated for by further adding the epoxidized oil.

The epoxidized oil may be, for example, epoxidized soybean oil, epoxidized castor oil, epoxidized linseed oil, epoxidized palm oil, epoxidized stearic acid, epoxidized oleic acid, epoxidized tall oil, epoxidized linoleic acid, or a mixture thereof. Preferably, the epoxidized oil is epoxidized soybean oil (ESO) or epoxidized linseed oil (ELO), but the present invention is not limited thereto.

In addition, the epoxidized oil may be included in an amount of 1 part by weight to 100 parts by weight, preferably, 10 parts by weight to 100 parts by weight, preferably, 20 parts by weight to 100 parts by weight, with respect to 100 parts by weight of the mixture of the terephthalate-based material and the epoxy-based alkyl ester compound. When the amount of the epoxidized oil is within the above ranges, a plasticizer compound with suitably excellent mechanical and physical properties and thermal resistance properties may be obtained.

Furthermore, when a terephthalate-based product and epoxidized oil are used in combination, an overall freezing point of the plasticizer composition may be further reduced, and thus the plasticizer composition has a much lower freezing point than that of an epoxy-based plasticizer composition, and thus a plasticizer composition without limitation on use even during the winter season may be provided.

Resin Composition

According to an embodiment of the present invention, there is provided a resin composition including: 100 parts by weight of a resin; and 5 parts by weight to 150 parts by weight of the above-described plasticizer composition.

The resin may be one or more resin selected from ethylene vinyl acetate, polyethylene, polypropylene, polyketone, polyvinyl chloride, polystyrene, polyurethane, and thermoplastic elastomers, and the plasticizer composition may be included in an amount of 5 parts by weight to 150 parts by weight, 40 parts by weight to 100 parts by weight, or 40 parts by weight to 50 parts by weight, with respect to 100 parts by weight of the resin, thereby providing a resin composition effective in compound formulation, sheet formulation, and plastisol formulation.

Since the resin composition includes the above-described plasticizer compound, the resin composition may be applied to a variety of applications, such as flooring materials, wallpaper, interior materials for automobiles, sheets, films, hoses, electric wires, and the like, and may exhibit basic mechanical and physical properties such as tensile strength, elongation rate, plasticizing efficiency, and volatile loss that are the same as or superior to those of existing plasticizers.

According to an embodiment of the present invention, the resin composition may further include a filler.

The amount of the filler may range from 0 parts by weight to 300 parts by weight, preferably, 50 parts by weight to 200 parts by weight, more preferably, 100 parts by weight to 200 parts by weight, based on 100 parts by weight of the resin.

The filler may be any filler known in the art and is not particularly limited. For example, the filler may be one selected from silica, magnesium carbonate, calcium carbonate, hard charcoal, talc, magnesium hydroxide, titanium dioxide, magnesium oxide, calcium hydroxide, aluminum hydroxide, aluminum silicate, magnesium silicate, barium sulfate, and mixtures thereof.

The resin composition may further include other additives such as a stabilizer and the like according to need.

The amount of the other additives such as a stabilizer and the like may range, for example, from 0 parts by weight to 20 parts by weight, preferably, from 1 part by weight to 15 parts by weight, based on 100 parts by weight of the resin.

The stabilizer may be, for example, a calcium-zinc-based (Ca—Zn-based) stabilizer such as a Ca—Zn composite stearate, or the like, but is not particularly limited thereto.

The invention claimed is:

1. A resin composition comprising:
100 parts by weight of a resin; and
5 parts by weight of a plasticizer composition comprising:
a terephthalate-based material; and
an epoxy-based alkyl ester compound represented by Formula 1 below
wherein a weight ratio of the terephthalate-based material to the epoxy-based alkyl ester compound is 90:10 to 50:50, and the epoxy-based alkyl ester compound is a single compound or a mixture of two or more compounds,
wherein the terephthalate-based material is a compound selected from the group consisting of diisononyl terephthalate (DINTP), dibutyl terephthalate (DBTP), butyl isononyl terephthalate (BINTP), butyl(2-ethylhexyl)terephthalate (BEHTP), and (2-ethylhexy) isononyl terephthalate (EHINTP):

<Formula 1>

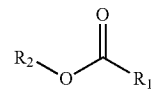

wherein, in Formula 1, $R_1$ is a C8-C20 alkyl group containing one or more epoxy groups, and $R_2$ is a C4 or C8 alkyl group, and
the resin comprises polyvinyl chloride.

2. The resin composition of claim 1, wherein the epoxy-based alkyl ester compound has an iodine value of less than 4 g $I_2$/100 g.

3. The resin composition of claim 1, wherein the epoxy-based alkyl ester compound has an epoxidation index (E.I.) of 1.5 or more.

4. The plasticizer composition of claim 1, further comprising an epoxidized oil.

5. The resin composition of claim 4, wherein the epoxidized oil is included in an amount of 1 part by weight to 100 parts by weight with respect to a weight of a mixture of the terephthalate-based material and the epoxy-based alkyl ester compound.

6. The resin composition of claim 4, wherein the epoxidized oil comprises one or more selected from the group consisting of epoxidized soybean oil, epoxidized castor oil, epoxidized linseed oil, epoxidized palm oil, and epoxidized tall oil.

7. The resin composition of claim 1, wherein the terephthalate-based material is diisononyl terephthalate (DINTP).

8. The resin composition of claim 1, wherein the terephthalate-based material is dibutyl terephthalate (DBTP).

9. The resin composition of claim 1, wherein the terephthalate-based material is butyl isononyl terephthalate (BINTP).

10. The resin composition of claim 1, wherein the terephthalate-based material is butyl(2-ethylhexyl)terephthalate (BEHTP).

11. The resin composition of claim 1, wherein the terephthalate-based material is (2-ethylhexyl)isononyl terephthalate (EHINTP).

12. The resin composition of claim 1, wherein, in Formula 1, $R_2$ is a C4 alkyl group.

13. The resin composition of claim 1, wherein, in Formula 1, $R_2$ is a C8 alkyl group.

14. The resin composition of claim 1, wherein the epoxy-based alkyl ester compound is an epoxidized fatty acid butyl ester (eFABE).

15. The resin composition of claim 1, wherein the epoxy-based alkyl ester compound is an epoxidized fatty acid 2-ethylhexyl ester (eFAEHE).

* * * * *